Dec. 26, 1933.     H. G. BUSIGNIES     1,940,902
DIRECTION FINDING
Filed Feb. 12, 1931     2 Sheets-Sheet 1

INVENTOR
HENRI G. BUSIGNIES
BY F. Hutchinson
ATTORNEY

Dec. 26, 1933.  H. G. BUSIGNIES  1,940,902
DIRECTION FINDING
Filed Feb. 12, 1931   2 Sheets-Sheet 2

INVENTOR
HENRI G. BUSIGNIES
BY
ATTORNEY

Patented Dec. 26, 1933

1,940,902

UNITED STATES PATENT OFFICE 1,940,902

DIRECTION FINDING

Henri G. Busignies, Paris, France, assignor to International Standard Electric Corporation, New York, N. Y., a corporation of Delaware Application February 12, 1931, Serial No. 515,240, and in Great Britain March 28, 1930

1 Claim. (Cl. 250—11)

This invention relates to improvements in radiogoniometers and the like.

It is well known that masses of conductive matter in the vicinity of radiogoniometer equipment cause errors in the directional indications given by the radiogoniometer. This effect is particularly noticeable on ships, where metallic masses such as the hull, funnels etc., cause the so-called "quadrantal error" to occur. In the case of a ship, a considerable increase in the electromagnetic field set up by the transmitting station occurs in the direction of the bows and stern. This increase in the magnetic field causes "quadrantal error" and the result is that true directional readings are not obtainable with a simple frame aerial.

Various proposals have been made for arrangements to overcome this difficulty, among which are such expedients as arranging an auxiliary coil or frame aerial or a wire screen in the vicinity of the main frame aerial, or employing a cam whose shape depends upon the variations of the electromagnetic field; the cam is driven by the shaft carrying the frame aerial and is adapted to drive an indicating dial in such a manner that a corrected reading is obtained.

According to the present invention, quadrantal error is substantially eliminated by employing a direction finding equipment comprising a rotatable frame aerial associated with compensating means such as metal plates or grids adjustably mounted on a non-metallic casing around the frame aerial the electromagnetic field around the frame aerial being thereby rendered constant.

A feature of the invention resides in the association of such a compensated frame aerial with an open antenna.

Figure 1:
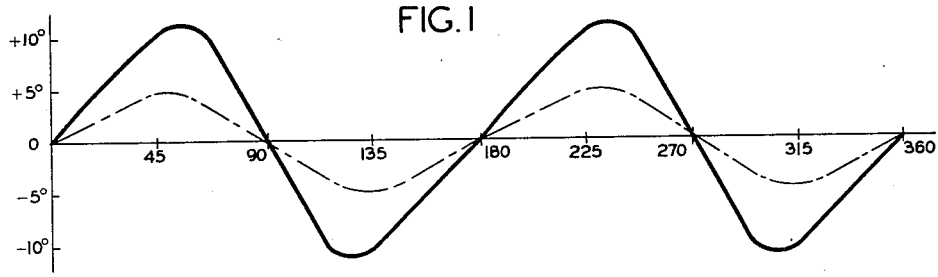
Figure 2:
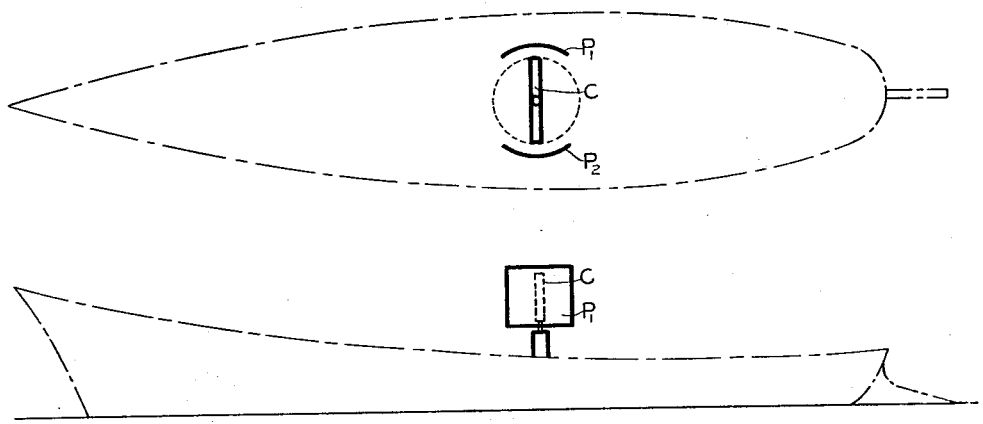
Figure 3:
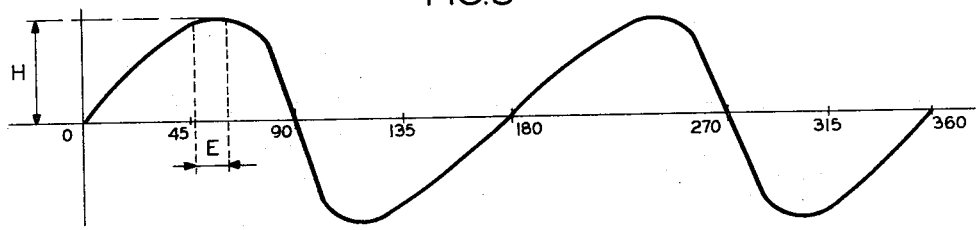
Figure 4:
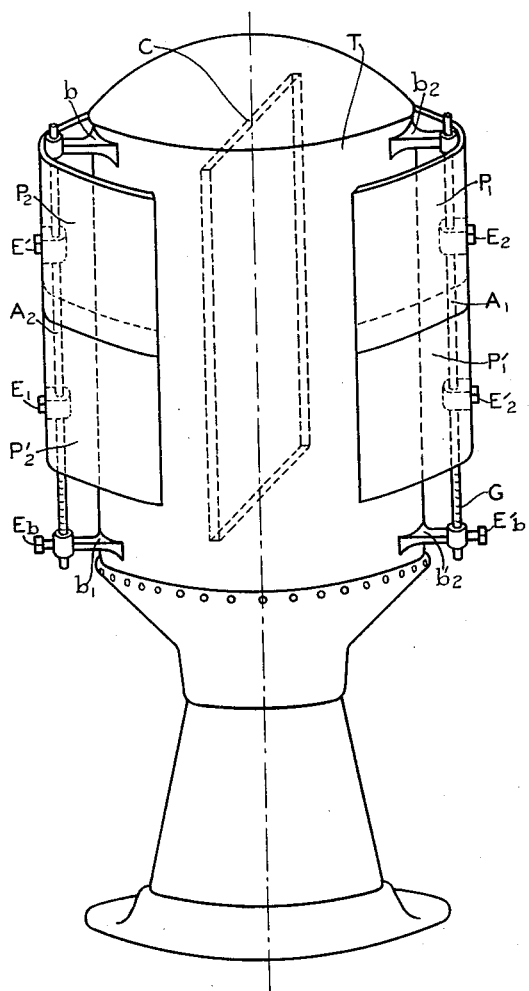

Further features of the invention will be apparent from the following description in which reference will be made to the accompanying drawings, Figure 1 of which shows curves representing quadrantal error, Figure 2 shows in plan and elevation a ship provided with compensated direction finding equipment according to the invention, Figure 3 shows a curve which will be employed in explaining the invention, Figure 4 shows in perspective a frame aerial and its associated equipment.

Referring now to Fig. 1, the two curves show how quadrantal error varies according to the position of a frame aerial, the ordinates being directional error in degrees and abscissæ degrees of revolution of the frame aerial. The full line curve shows quadrantal error for a frame in one position on the ship, while the broken line shows how the error changes if the aerial is moved to another part of the ship. It will be seen that the curves of quadrantal error are of substantially sinusoidal form and that the maximum error may be as much as 19.5 degrees at 45°, 135°, 225° and 315° to the axis of the ship. Generally, however, the maximum error does not exceed 10° if the frame aerial is far enough from the deck.

Figure 2 shows schematically a ship provided with compensated direction finding equipment according to the preferred embodiment of the invention. In this figure, C represents a frame aerial and P1, P2 are metal plates which may conveniently be symmetrically arranged with regard to the axis of the ship.

A suggested explanation of the manner in which the plates P1, P2 function to overcome quadrantal error is that the electromagnetic field of the received wave, in traversing the plates, produces induced currents therein, whereby a second magnetic field is produced, opposing the magnetic field set up by the received wave.

In order that errors individual to a certain ship may be readily compensated, a curve such as that shown in Fig. 3 may be plotted, the readings being taken with the compensating plates removed from the vicinity of the frame aerial. As will be more fully explained hereinafter the deviation of the maximum error from 45° (shown as distance E in Fig. 3) is then corrected by moving the plates around their individual axes, and the effective area of plates is adjusted according to the magnitude (H, Fig. 3) of the error.

A practical embodiment of the invention is illustrated in Fig. 4. A rotatable frame aerial C is accommodated in a protecting casing T. It is convenient to make this casing of an insulating and/or weatherproof substance. On the outside of the casing, brackets $b$, $b_1$, $b_2$, $b_2^1$, are provided for supporting spindles A1 and A2 which carry metal plates P1, $P_1^1$, and P2, $P_2^1$. The effective area of the plates may be adjusted by sliding them apart along the spindles or collapsing them one within another; screws $E^1$, E1, E2, $E_2^1$, are provided to enable the plates to be fixed in any desired positions, while graduations G enable a record of the positions to be made.

The position of the plates relative to the axis of the ship may be adjusted by loosening screws $Eb$, $E^1b$, and turning the plates and spindles, this being done in accordance with the deviation E of Fig. 3.

It will generally be necessary to take a further set of readings with the plates adjusted as described to ascertain whether the adjustments have actually caused the quadrantal error to be compensated.

A compensated frame aerial according to the invention may be employed in conjunction with an open antenna. The use of a compensated frame aerial in this manner enables the "180°" error of an open antenna to be obviated.

What is claimed is:

In a radio direction finding equipment the combination of a non-metallic casing, a frame aerial mounted within said casing, a plurality of spindles and conducting surfaces rotatably and slidably supported on said spindles outside casing, and means to clamp said surfaces in position on said spindles.

HENRI G. BUSIGNIES.